US007873053B2

(12) United States Patent
Papadimitriou

(10) Patent No.: US 7,873,053 B2
(45) Date of Patent: Jan. 18, 2011

(54) METHOD AND APPARATUS FOR RESERVING NETWORK RESOURCES FOR PSEUDO POINT-TO-POINT CONNECTIONS

(75) Inventor: Dimitri Papadimitriou, Brussels (BE)

(73) Assignee: Alcatel Lucent, Paris (FR)

( * ) Notice: Subject to any disclaimer, the term of this patent is extended or adjusted under 35 U.S.C. 154(b) by 273 days.

(21) Appl. No.: 12/103,528

(22) Filed: Apr. 15, 2008

(65) Prior Publication Data
US 2008/0259931 A1 Oct. 23, 2008

(30) Foreign Application Priority Data
Apr. 17, 2007 (EP) ................... 07290473

(51) Int. Cl.
*H04L 12/56* (2006.01)
(52) U.S. Cl. ................... 370/395.3; 370/465
(58) Field of Classification Search .......... None
See application file for complete search history.

(56) References Cited

U.S. PATENT DOCUMENTS

| 2005/0220143 | A1* | 10/2005 | DelRegno et al. | 370/471 |
| 2007/0030851 | A1* | 2/2007 | Sinicrope et al. | 370/392 |
| 2007/0280102 | A1* | 12/2007 | Vasseur et al. | 370/225 |
| 2008/0069007 | A1* | 3/2008 | Vasseur et al. | 370/254 |

OTHER PUBLICATIONS

Aggarwal et al, "Setup and Maintenance of Pseudowires using RSVP-TE", IETF Standard-Working-draft, Internet Engineering Task Force, IETF, CH, No. 3, Oct. 2005, XP015042991.

Chris Metz et al, "Pseudowire Attachment identifiers for Aggregation and VPN Autodiscovery", IETF Standard-Working-Draft, Internet Engineering Task Force, IETF, CH, vol. pwe3, No. 1, Oct. 4, 2006, XP015046904.
Martini et al, "Pseudowire Setup and Maintenance Using the Label Distribution Protocol (LDP)", IETF Standard, Internet Engineering Task Force, IETF, CH, Apr. 2006, XP015046298.
Bryant et al, "Pseudo Wire Emulation Edge-to-Edge (PWE3) Architecture", IETF Standard, Internet Engineering Task Force, IETF, CH, Mar. 2005, XP015009756.
Martini, "Dynamic Placement of Multi Segment Pseudo Wires", IETF Standard-Working Draft, Internet Engineering Task Force, IETF, CH, vol. pwe3, No. 2, Oct. 2006, XP015048043.

* cited by examiner

*Primary Examiner*—Chirag G Shah
*Assistant Examiner*—Salvador E Rivas
(74) *Attorney, Agent, or Firm*—Harness, Dickey & Pierce

(57) ABSTRACT

An embodiment includes encoding, into a resource reservation signaling message, (i) a group identifier assigned to a group of pseudo point-to-point connections established between a root node and at least one leaf node and (ii) a sub-group identifier assigned to a sub-group of pseudo point-to-point connections out of the group of pseudo point-to-point connections. The sub-group of pseudo point-to-point connections share a common network tunnel established between a previous signaling hop and a next signaling hop. The method further includes aggregating, into the resource reservation signaling message, resource reservation signaling related to the sub-group of pseudo point-to-point connections based on the group identifier and the sub-group identifier. The resource reservation signaling message is then exchanged between the previous signaling hop and the next signaling hop.

5 Claims, 5 Drawing Sheets

METHOD AND APPARATUS FOR RESERVING NETWORK RESOURCES FOR PSEUDO POINT-TO-POINT CONNECTIONS

BACKGROUND (1) Field of the Invention

The present invention relates to a method for reserving network resources for pseudo point-to-point connections by means of an idempotent resource reservation protocol.

(2) Description of Related Art

Examples of idempotent resource reservation protocols are Resource reservation Protocol (RSVP) as initially defined in Request For Comment (RFC) 2205 published by the Internet Engineering Task Force (IETF) in September 1997, or Resource reSerVation Protocol—Traffic Engineering (RSVP-TE) as initially defined in RFC 3209 published by the IETF in December 2001, that is to say an extension to RSVP for Label Switched Paths (LSP) such as Multi-Protocol Label Switching (MPLS) paths, or RSVP-TE Extensions for Generalized Multi-Protocol Label Switching (GMPLS) as initially defined in RFC 3473 published by the IETF in January 2003, that is to say an extension to RSVP for time-division switching such as Synchronous Optical Network (SONET), Synchronous Digital Hierarchy (SDH), wavelength (optical lambdas), and spatial switching such as incoming port/fiber to outgoing port/fiber.

Examples of pseudo point-to-point connections are Pseudo wires (PW) as defined in RFC 3985 published by the IETF in December 2005, or Multi Segment—Pseudo wires (MS-PW) as defined in Internet draft draft-ietf-pwe3-dynamic-ms-pw-02.txt entitled "Dynamic Placement of Multi Segment Pseudo wires" and posted on the IETF web site in October 2006.

PW emulates Frame Relay, ATM, Ethernet, Time Division Multiplexing (TDM), or SONET/SDH point-to-point connections (or wires) across a Packet Switched network (PSN).

The behavior and characteristics of the native service are emulated by means of the following functions:

encapsulation of bit streams, cells, or packets arriving at an ingress port (logical or physical), carriage of the encapsulated data across a PSN tunnel, such as an MPLS path, a Layer 2 Tunneling Protocol (L2TP) tunnel, etc, establishment of the PW, including the exchange and/or distribution of the PW identifiers used by the PSN tunnel endpoints, managing the signaling, timing, order, or other aspects of the native service at the boundaries of the PW, service-specific status and alarm management.

Provider Edge equipment (PE) provide Customer Edge equipment (CE) with the emulated native service via an Attachment Circuit (AC). An AC denotes a physical or virtual circuit attaching a CE to a PE such as a Frame Relay DLCI, an ATM VPI/VCI, an Ethernet port, a virtual Local Area Network (VLAN), a Point-to-Point Protocol (PPP) connection on a physical interface, an MPLS LSP, etc.

PEs accommodate the following data plane functions:

Native Service Processing (NSP), that is to say processing of the data received by the PE from the CE before presentation to the PW for transmission across the PSN, or processing of the data received from a PW by a PE before it is output on the AC, Forwarder (FWRD), that is to say selection of the PW to use in order to transmit a payload received on an AC.

The following signaling mechanisms are further required:

end-to-end signaling between the CEs, such as Frame Relay Permanent virtual Circuit (PVC) status signaling, ATM Switched virtual Circuit (SVC) signaling, TDM Circuit Associated Signaling (CAS), etc, PW maintenance between the PEs to set up, maintain, and tear down PWs, including any required coordination of parameters, PSN tunnel signaling to control the PW multiplexing and some elements of the underlying PSN, such as L2TP control protocol, MPLS Label Distribution Protocol (LDP), or RSVP-TE.

There is a requirement for service providers to be able to extend the reach of PW across multiple PSN domains. A Multi-Segment PW (MS-PW) is defined as a set of two or more contiguous PW segments that behave and function end-to-end as a single PW.

For MS-PW support, PEs are further instantiated as terminating provider edge equipment (T-PE) and switching provider edge equipment (S-PE), the former being present in the first and last segments of a MS-PW and terminating the MS-PW via an AC, the latter inter-connecting PW segments of a MS-PW between different PSN domains.

T/S-PEs are exchanging MS-PWs resource reservation signaling (e.g., by means of RSVP-TE) so as they can appropriately select/establish the underlying PSN tunnels towards the next signaling hop and reserve the corresponding network resources.

The disclosed method is disadvantageous in the event of many MS-PWs terminating at a single head-end T-PE. Indeed, resource reservation sessions need to be maintained for each and every MS-PW, causing this head-end T-PE to be over-flooded with resource reservation signaling and states. This solution is clearly not scalable.

SUMMARY

It is an object of the present invention to improve scalability of resource reservation signaling for MS-PWs (or alike) in the event of many MS-PWs terminating at a single T-PE.

According to the invention, this object is achieved due to the fact that said method comprises the steps of:

encoding, into a resource reservation signaling message, a group identifier assigned to a group of pseudo point-to-point connections established between a root node and at least one leaf node, and a sub-group identifier assigned to a sub-group of pseudo point-to-point connections out of said group of pseudo point-to-point connections, which sub-group of pseudo point-to-point connections sharing a common network tunnel established between a previous signaling hop and a next signaling hop, aggregating, into said resource reservation signaling message, resource reservation signaling related to said sub-group of pseudo point-to-point connections by means of said group identifier and said sub-group identifier, exchanging said resource reservation signaling message between said previous signaling hop and said next signaling hop.

The group of pseudo point-to-point connections comprises one or more pseudo point-to-point connections that have one unique ingress T-PE (further referred to as the root node) and one or more egress T-PE (further referred to as the leaf nodes). This group is identified by means of a group identifier that is at least unique within the scope of the root node. This identifier may comprise for example the network address (or any global logical identifier) of the root node and a local identifier locally assigned by the root node.

The group of pseudo point-to-point connections share the same resource reservation session, and the group identifier remains constant over the lifetime of the session.

The sub-group of pseudo point-to-point connections comprises one or more pseudo point-to-point connections that are selected from the group of pseudo point-to-point connections, and the traffic of which can be aggregated between neighboring T/S-PES over a common PSN tunnel. This sub-group is identified by means of a sub-group identifier that is at least unique within the scope of the common network tunnel. The sub-group identifier may be further unique within the scope of the previous and next signaling hop adjacency, and/or may be further unique within the scope of the previous signaling hop. This identifier may comprise for example the network address (or any global logical identifier) of the previous signaling hop and a local identifier locally assigned by the previous signaling hop.

Resource reservation signaling related to the sub-group of pseudo point-to-point connections (e.g., such as exchanged by means of typical RSVP path or resv messages) are then aggregated into a single resource reservation signaling message (and thus form part of the same resource reservation session) by means of both the group and sub-group identifiers.

The advantages are twofold. First, resource reservation signaling are aggregated (resp. disaggregated) on the way towards the root node (resp. the leaf nodes) since more and more (resp. less and less) pseudo point-to-point connections can be aggregated on a single PSN tunnel, thereby greatly reducing the signaling load incurred by a signaling node, and thus improving the system scalability. Second, network resources for a new pseudo point-to-point connection can be reserved by means of a new sub-group identifier while re-using an existing resource reservation session associated with a given group identifier. There is no need for re-signaling the states of all the pseudo point-to-point connections that share the same session (and possibly also the same PSN tunnel), yet that make use of another sub-group identifier. Alternatively speaking, the idempotence of the resource reservation protocol is only at the extent of both the group and sub-group identifiers, or still alternatively resource reservation signaling related to the sub-group of pseudo point-to-point connections are "idempotently" aggregated relatively to both the group and sub-group identifiers.

A further embodiment of a method according to the invention is characterized in that said method further comprises the step of aggregating resource reservation states related to said sub-group of pseudo point-to-point connections by means of said group identifier and said sub-group identifier.

This embodiment is particularly advantageous compared to the known method wherein the resource reservation states are held on a per pseudo point-to-point connection basis. Indeed, reservation object attributes of a sub-group of pseudo point-to-point connections that share the same value, such as a common traffic specification, need only to be stored once, thereby lessening the memory requirements of a signaling node, and thus improving the system scalability at a further extent.

Another embodiment of a method according to the invention is characterized in that said idempotent resource reservation protocol is RSVP-TE, in that a session object includes said group identifier and in that either a sender_template object or a filter_spec object includes said sub-group identifier.

This embodiment is particularly advantageous in that it makes an intelligent re-use of current RSVP objects. For example, the session object, which initially comprised the IP destination address, the IP protocol id and some form of generalized destination port, is obsoleted by the fact that different pseudo point-to-point connections having different destinations are merged into the same session. Consequently, the session object can be re-used for encoding the group identifier which is in one-to-one relationship with a given session.

Further characterizing embodiments are mentioned in the appended claims.

The present invention also relates to a network node comprising a signaling unit adapted to reserve network resources for pseudo point-to-point connections by means of an idempotent resource reservation protocol.

A network node according to the invention is characterized in that said signaling unit is further adapted:

to encode, into a resource reservation signaling message, a group identifier assigned to a group of pseudo point-to-point connections established between a root node and at least one leaf node, and a sub-group identifier assigned to a sub-group of pseudo point-to-point connections out of said group of pseudo point-to-point connections, which sub-group of pseudo point-to-point connections sharing a common network tunnel established between said network node and a further signaling hop, to aggregate, into said resource reservation signaling message, resource reservation signaling related to said sub-group of pseudo point-to-point connections by means of said group identifier and said sub-group identifier, to transmit said resource reservation signaling message to said further signaling hop.

Embodiments of a network node according to the invention correspond with the embodiments of a method according to the invention.

It is to be noticed that the term 'comprising', also used in the claims, should not be interpreted as being restricted to the means listed thereafter. Thus, the scope of the expression 'a device comprising means A and B' should not be limited to devices consisting only of components A and B. It means that with respect to the present invention, the relevant components of the device are A and B.

Finally, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAIL DESCRIPTION OF EXAMPLE EMBODIMENTS

Figure 1:
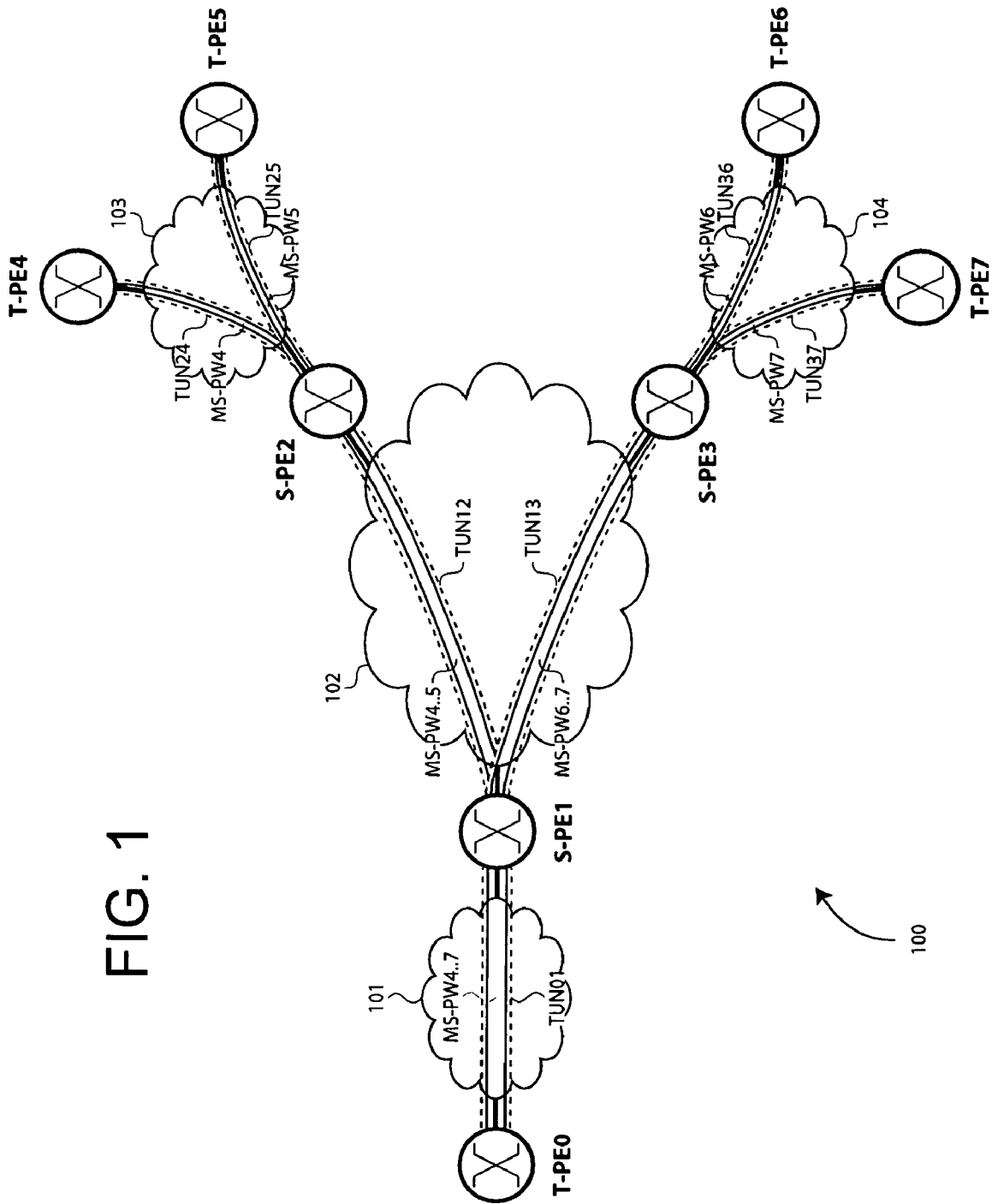
FIG. 1 represents a data communication system including provider edge equipment according to the invention.

There is seen in FIG. 1 a data communication system 100 comprising:
 terminating provider edge equipment T-PE0, and T-PE4 to T-PE7,
 switching provider edge equipment S-PE1 to S-PE3,
 packet switched networks 101 to 104.

T-PE0 is coupled to PSN 101, T-PE4 and T-PE5 are coupled to PSN 103, and T-PE6 and T-PE7 are coupled to PSN 104.

S-PE1 interconnects PSNs 101 and 102, S-PE2 interconnects PSNS 102 and 103, and S-PE3 interconnects PSNs 102 and 104.

In a preferred embodiment of the present invention, PSNS 101 to 104 are MPLS-based networks.

The data communication system 100 emulates point-to-point connections between attachment circuits of terminating provider edge equipment.

In a preferred embodiment, these pseudo point-to-point connections are MS-PWs.

MS-PW4 to MS-PW7 emulate point-to-point connections between ACS of T-PE0 (root node) and ACS of respectively ones of T-PE4 to T-PE7 (leaf nodes).

PSN tunnels are established between provider edge equipment for tunneling MS-PW traffic. TUNxy denotes a bi-directional MPLS LSP established between T/S-PEx and T/S-PEy across the corresponding PSN.

MS-PW4 to MS-PW7 traffic is tunneled through tunnel TUN01 between T-PE0 and S-PE1, MS-PW4 to MS-PW5 traffic (resp. MS-PW6 to MS-PW7 traffic) is tunneled through tunnel TUN12 (resp. TUN13) between S-PE1 and S-PE2 (resp. between S-PE1 and S-PE3), and MS-PW4 traffic (resp. MS-PW5, MS-PW6 or MS-PW7 traffic) is tunneled through tunnel TUN24 (resp. TUN25, TUN36, or TUN37) between S-PE2 and T-PE4 (resp. between S-PE2 and T-PE5, between S-PE3 and T-PE6, or between S-PE3 and T-PE7).

In a preferred embodiment, RSVP-TE is used as resource reservation protocol for reserving network resources for both PSN tunnels and MS-PWs. Tunnel TUNxy is guaranteed a particular traffic bandwidth with a particular service class through the corresponding PSN, and MS-PW4 to MS-PW7 are end-to-end guaranteed a particular traffic bandwidth with a particular service class through the data communication system 100.

Figure 2:
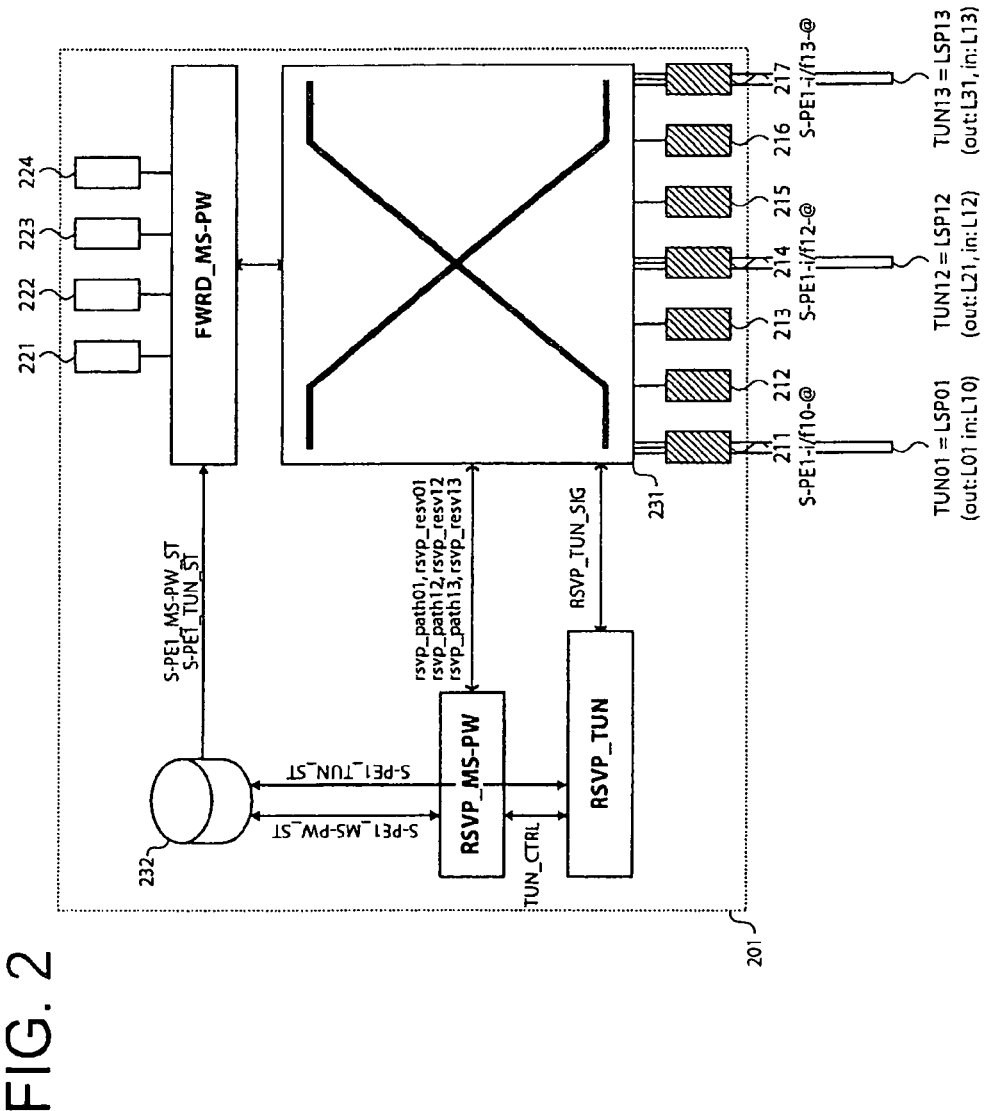
FIG. 2 represents a provider edge equipment according to the invention.

There is seen in FIG. 2 a terminating or switching provider edge equipment 201 according to the invention comprising:
 Input/Output (I/O) ports 211 to 217,
 optionally, ACs 221 to 224 (only in case of T-PE),
 an IP/MPLS switch fabric 231,
 a data repository 232.

The provider edge equipment 201 further comprises the following noticeable functional units:
 a first signaling unit RSVP_TUN,
 a second signaling unit RSVP_MS-PW,
 an MS-PW forwarder FWRD_MS-PW.

The I/O ports 211 to 217 are coupled to the switch fabric 231. The ACs 221 to 224, if any, are coupled to the forwarder FWRD_MS-PW. The signaling units RSVP_TUN and RSVP_MS-PW and the forwarder FWRD_MS-PW are further coupled to both the switch fabric 231 and to the data repository 232. The signaling units RSVP_TUN is further coupled to the signaling unit RSVP_MS-PW.

The I/O ports 211 to 217 and the ACs 221 and 224 are adapted to receive and transmit physical signals, being an electrical signal, an optical signal, or a radio electromagnetic signal.

The switch fabric 231 is adapted to switch IP or MPLS packets from any ingress port towards any egress port. Switching is driven by an IP routing table or an MPLS label binding table (not shown).

The data repository 232 can be of any type, being Random Access Memory (RAM), Electrically Erasable Programmable Read Only memory (E2PROM), flash memory, a magnetic or optical disk, etc.

The signaling unit RSVP_TUN is adapted to reserve network resources for MPLS tunnels (or LSPs) across the corresponding PSNs by means of RSVP-TE.

The signaling unit RSVP_MS-PW is adapted to reserve network resources for MS-PWs by means RSVP-TE. Corresponding RSVP messages are exchanged between neighboring T/S-PEs. The next signaling hop is determined by means of a PW routing table (where MS-PW destinations are identified by means of e.g. an egress node identifier and an AC identifier), or by means of an explicit route RSVP object.

The forwarder FWRD_MS-PW is adapted to terminate an MPLS tunnel through which traffic of a preceding PW segment is received, and to insert the next PW and MPLS labels for further forwarding through the switch fabric 231 towards the next MPLS tunnel through which traffic of the succeeding PW segment is sent. Forwarding is driven by MS-PW's and tunnel's RSVP states as read from the data repository 232 and further binding/multiplexing information (e.g., association between a particular MS-PW and a particular tunnel).

The forwarder FWRD_MS-PW is further adapted to forward payload elements selectively from one or more ACs to one or more PWs, and vice-versa. The forwarder FWRD_MS-PW selects the PW based on, for example, the incoming AC, the contents of the payload, or some statically and/or dynamically configured forwarding information.

The PSN tunnels that terminate on S-PE1 are drawn on FIG. 2 as an exemplary embodiment: the PSN tunnel TUN01 (or LSP01), which is established between T-PE0 and S-PE1, and which is assigned L10 and L01 as incoming and outgoing MPLS labels respectively, terminates on I/O port 211, the PSN tunnel TUN12 (or LSP12), which is established between S-PE1 and S-PE2, and which is assigned L12 and L21 as incoming and outgoing MPLS labels respectively, terminates on I/O port 214, and the PSN tunnel TUN13 (or LSP13), which is established between S-PE1 and S-PE3, and which is assigned L13 and L31 as incoming and outgoing MPLS labels respectively, terminates on I/O port 217. Some or all of these tunnels may terminate on the same I/O port (e.g., TUN 12 and TUN 13 may terminate on a common I/O port for connection towards PSN 102).

An exemplary operation of the data communication system 100 follows, with particular focus on RSVP message interactions between T-PE0, S-PE1, S-PE2 and T-PE4, and further on the operation of S-PE1.

The forward direction denotes the direction of the RSVP path messages, that is to say the direction from the root node towards the leaf nodes as reservation is initiated by the root node. The reverse direction denotes the direction of the RSVP resv messages, that is to say the direction from the leaf nodes towards the root node. The previous and next signaling hop are defined with respect to the forward direction.

Figure 3:
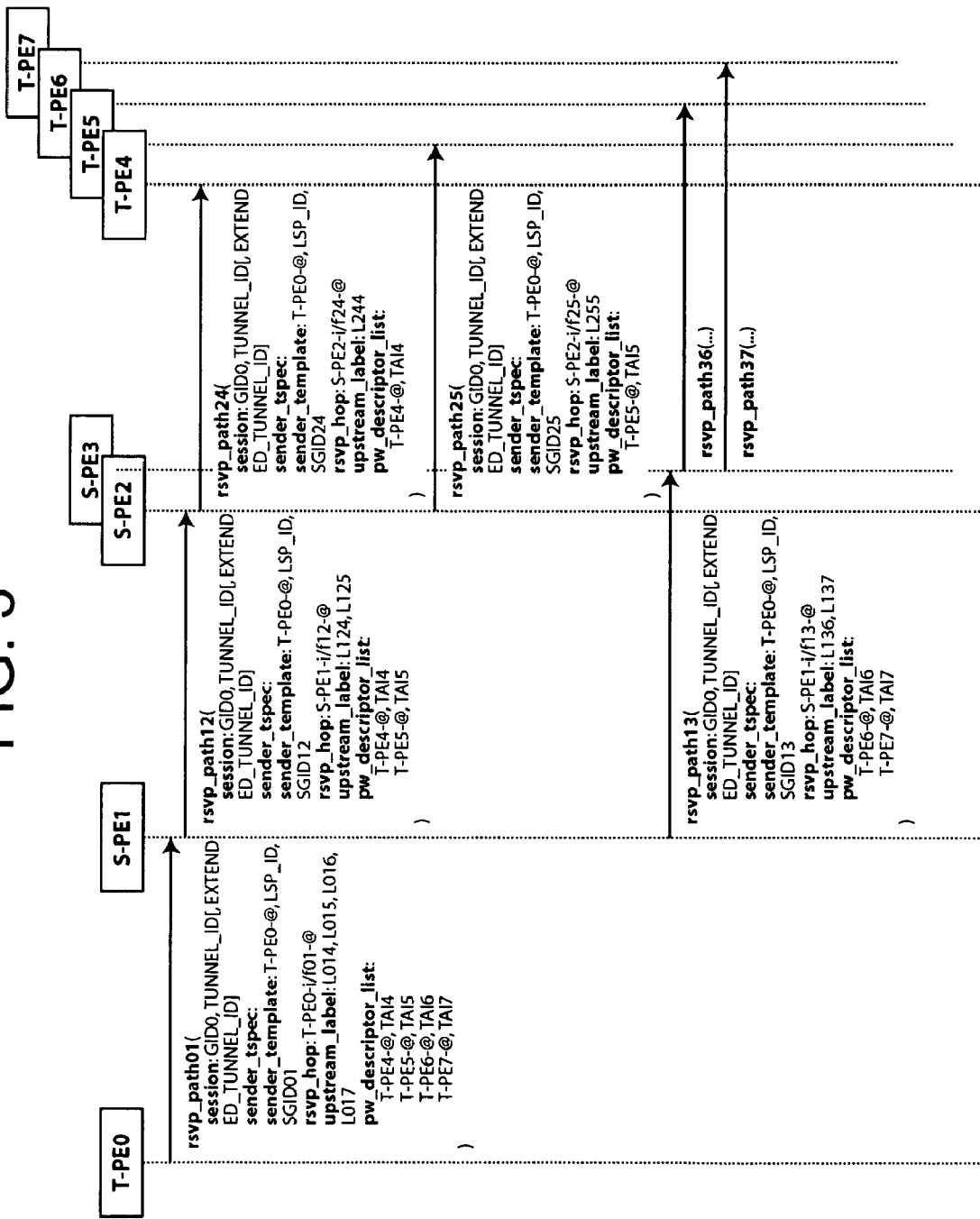
FIG. 3 represents RSVP path message flow between provider edge equipment.

There is seen in FIG. 3 RSVP path messages exchanged between provider edge equipment for initiating network resources reservation for MS-PW4 to MS-PW7.

rsvp_pathxy message denotes an RSVP path message issued by T/S-PEx and bound to T/S-PEy.

rsvp_pathxy message includes the following RSVP objects:

a session object, the definition of which is amended for including:

a group identifier GID0 identifying a group of MS-PWs originating from a root node, presently MS-PW4 to MS-PW7 originating from T-PE0, a tunnel identifier, which further comprises a TUNNEL_ID, possibly combined with an EXTENDED_TUNNEL_ID, a sender_tspec object, which describes common traffic specification (or traffic characteristics) of MS-PW flows, and which is used for network resource reservation, a sender_template object, the definition of which is amended for including:

a global identifier T-PE0-@ of the root node, such as an IP address, an LSP identifier LSP_ID, a sub-group identifier SGIDxy, identifying a sub-group of MS-PWs that share a common PSN tunnel TUNxy from T/S-PEx to T/S-PEy, an rsvp_hop object, which contains the IP address T/S-PEX-i/fxy-@ of the previous signaling hop, T/S-PEX-i/fxy-@ denoting the IP address of the interface (i/f) of T/S-PEX bound to T/S-PEy (it is worth noting that T/S-PEX-i/fxy-@ may match T/S-PEX-i/fxy'-@ if T/S-PEy and T/S-PEy.degree. are reachable via the same network interface), an upstream_label object, which contains an ordered list of PW labels to be used in the reverse direction, Lxyz denoting the PW label used from T/S-PEy to T/S-PEX for MS-PWz (upstream labels are listed in the same order as corresponding MS-PWs in pw_descriptor_list object), a new pw_descriptor_list object, which contains a list of MS-PWs aggregated under the same group and sub-group identifier, presently GID0 and SGIDxy, a particular MS-PWz being identified by a global identifier T-PEZ-@ of the corresponding leaf node T-PEZ, such as an IP address, and by an identifier TAIZ of the corresponding AC.

In a preferred embodiment of the present invention, the group identifier is assigned by the root node, and comprises a global identifier that identifies the root node, such as an IP address, and a local identifier locally assigned by the root node. It is up to the root node to select the MS-PWs to be grouped within the same group identifier and sharing the same RSVP session.

The sub-group identifier is assigned by the previous signaling hop (T-PE0 for rsvp_path12 message, S-PE1 for rsvp_path12 and rsvp_path13 messages, etc), and similarly comprises a global identifier of the previous signaling hop, such as an IP address, and a local identifier locally assigned by the previous signaling hop. It is up to the previous signaling node to select the MS-PWs to be grouped within the same sub-group identifier, e.g. based on a configurable threshold that defines the maximum number of MS-PWs that can be aggregated under the same sub-group identifier.

Upon receipt of rsvp_path01 message, S-PE1 (more specifically the signaling unit RSVP_MS-PW) determines the next RSVP signaling hop for each and every MS-PW listed in pw_descriptor_list object, presently S-PE2 for MS-PW4 and MS-PW5, and S-PE3 for MS-PW6 and MS-PW7. Next, the signaling unit RSVP_MS-PW identifies MPLS tunnels for tunneling MS-PW traffic towards S-PE2 and S-PE3, presently TUN 12 (or LSP 12) and TUN 13 (or LSP 13) respectively. MPLS tunnels are identified by querying the tunnel's states S-PE1_TUN_ST stored and maintained in the data repository 232 by the signaling unit RSVP_TUN. If such a tunnel is not yet established, the signaling unit RSVP_MS-PW requests the signaling unit RSVP_TUN to establish it (see TUN_CTRL and RSVP_TUN_SIG in FIG. 2). Finally, the signaling unit RSVP_MS-PW issues two RSVP path messages rsvp_path12 and rsvp_path13 towards S-PE2 and S_PE3 respectively with the corresponding MS-PWs aggregated therein. Presently, MS-PW4 and MS-PW5 are aggregated into rsvp_path12 message by means of the current group identifier GID0 and a new sub-group identifier SGID12 assigned by S-PE1. Similarly, MS-PW6 and MS-PW7 are aggregated into rsvp_path13 message by means of the current group identifier GID0 and a new sub-group identifier SGID13.

The process repeats at each and every node, presently S-PE2 identifies T-PE4 and T-PE5 as next signaling hop of MS-PW4 and MS-PW5 respectively, and issues two RSVP path messages rsvp_path24 and rsvp_path25 towards T-PE4 and T_PE5 respectively, rsvp_path24 message including MS-PW4 signaling under GID0 and a new sub-group identifier SGID24, and rsvp_path25 message including MS-PW5 signaling under GID0 and SGID25. The same applies for S-PE3 which issues rsvp_path36 and rsvp_path37 messages towards T-PE6 and T-PE7 respectively.

Figure 4:
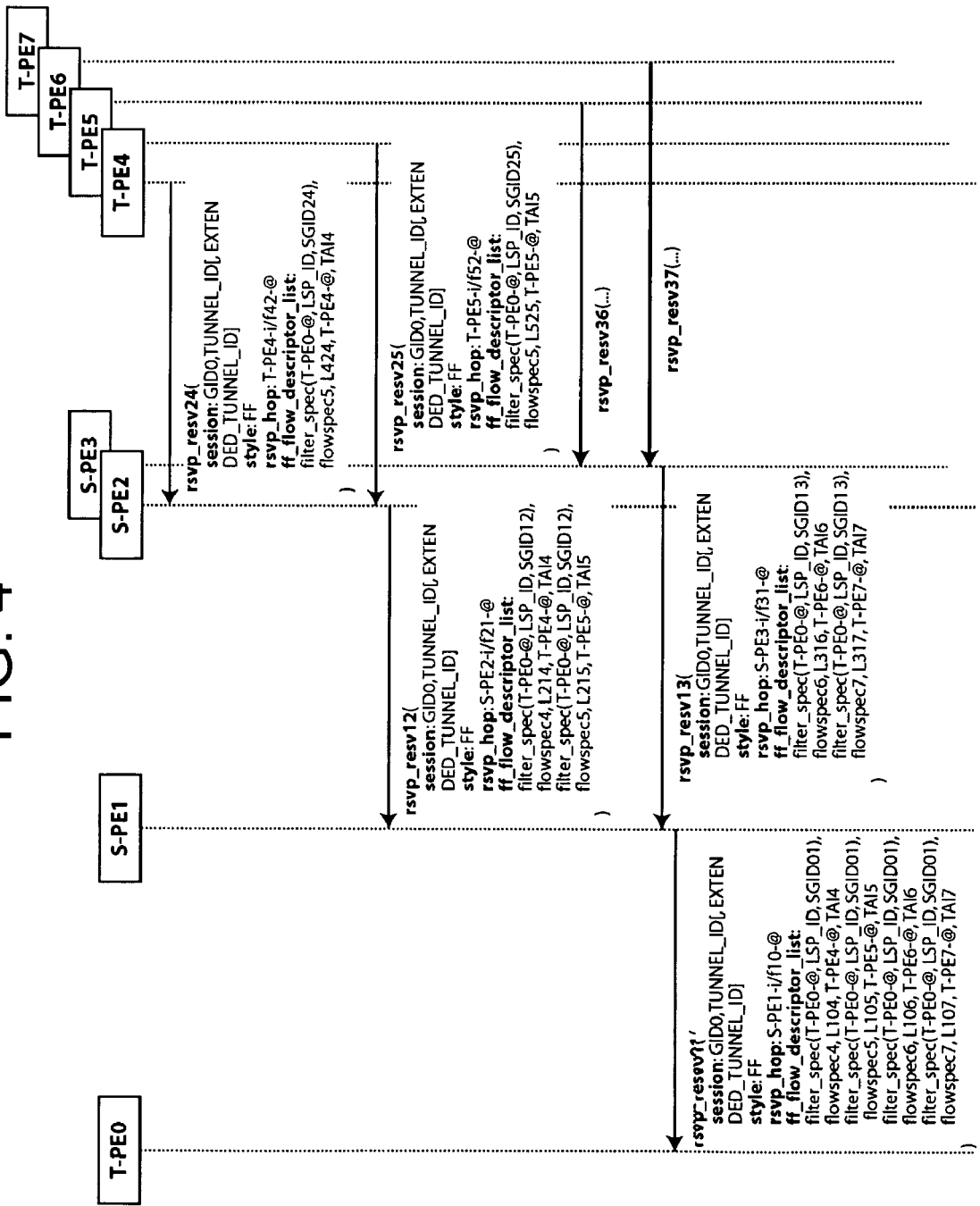
FIG. 4 represents RSVP resv message flow between provider edge equipment.

There is seen in FIG. 4 RSVP resv messages exchanged between provider edge equipment for acknowledging network resources reservation for MS-PW4 to MS-PW7.

rsvp_resvxy message denotes an RSVP resv message issued by T/S-PEy and bound to T/S-PEx.

rsvp_resvxy message includes the following RSVP objects:

a session object as previously defined (i.e., including the group identifier), a style object, which defines the reservation style, the only applicable style for point-to-point connections being Fixed Filter (FF) style, an rsvp_hop object, which contains the IP address T/S-PEx-i/fyx-@ of the next signaling hop, T/S-PEX-i/fyx-@ denoting the IP address of the interface of T/S-PEy bound to T/S-PEx, a new ff_flow_ descriptor_list object, which contains the list of the flow descriptors associated with the MS-PWs aggregated under the same group and sub-group identifier, presently GID0 and SGIDxy, each flow descriptor comprising:

a filter_spec object, the definition of which matches the amended definition of the sender_template object (i.e., including the sub-group identifier), a flowspec object, which defines information necessary to make reservation requests into the network for a particular MS-PW (this includes an indication of which class of service service is being requested, and the parameters needed for that service), flowspecz denoting the flowspec applicable for MS-PWz, a PW label to be used in the forward direction for that particular MS-PW, Lyxz denoting the PW label used from T/S-PEx to T/S-PEy for MS-PWz, a leaf node identifier and an AC identifier that identifies that particular MS-PW.

Upon receipt of rsvp_resv12 message, S-PE1 (more specifically the signaling unit RSVP_MS-PW) determines the previous signaling hop of the MS-PWs listed in rsvp_resv12 message, presently T-PE0 for MS-PW4 and MS-PW5, and the corresponding sub-group identifier used by T-PE0 for those MS-PWs, presently SGID01. The signaling unit RSVP_MS-PW then issues rsvp_resv01 message towards the previous signaling hop T-PE0, which includes the reservation confirmation of all the MS-PWs aggregated under GID0 and SGID01, presently MS-PW4 to MS-PW7 (S-PE1 may need to wait for the receipt of rsvp_resv13 message from S-PE3 beforehand so as to get the flowspec of MS-PW6 and MS-PW7).

As one can see, more and more RSVP resv messages are aggregated on the way towards the root node, thereby greatly reducing the signaling load the provider edge equipment have to deal with and improving the equipment and network scalability.

Figure 5:
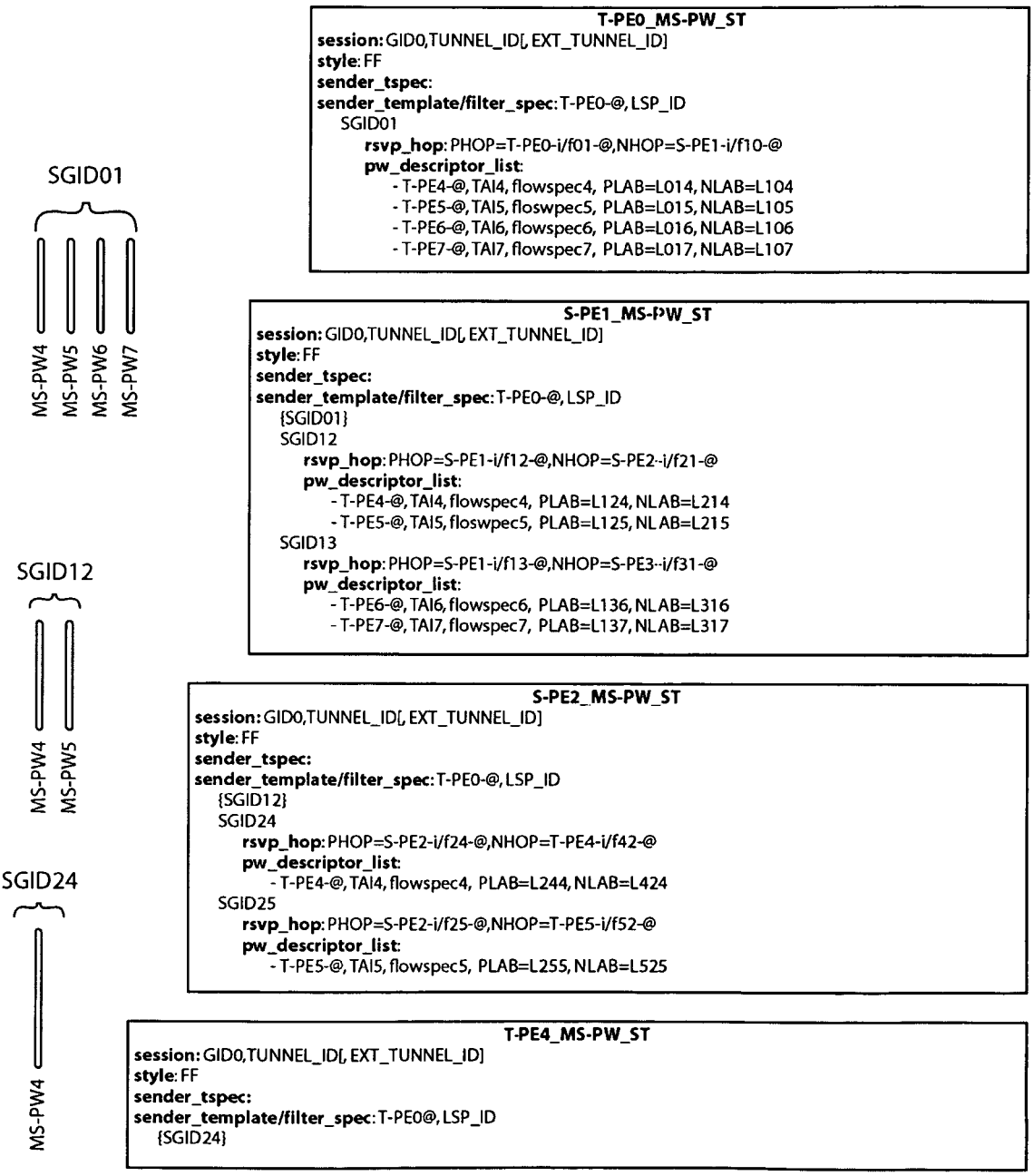
FIG. 5 represents RSVP reservation states stored in provider edge equipment.

There is seen in FIG. 5 the MS-PW's RSVP states for provider edge equipment T-PE0, S-PE1, S-PE2 and T-PE4, denoted as T-PE0_MS-PW_ST, S-PE1_MS-PW_ST, S-PE2_MS-PW_ST and T-PE4_MS-PW_ST respectively, along with the sub-group identifiers and corresponding MS-PW sub-groups used at each T/S-PE adjacency.

The notation {SGIDxy} denotes the inclusion of the object attribute values aggregated under the sub-group identifier SGIDxy as explicitly recited for the previous signaling hop.

PHOP and NHOP stand for previous and next signaling hop respectively, PLAB and NLAB stand for reverse and forward PW label respectively. PHOP, NHOP, PLAB and NLAB are defined with respect to a particular T/S-PE adjacency.

As one can see, RSVP object attributes that keeps identical values across different MS-PWs belonging to the same sub-group, such as the previous and next signaling hop (PHOP, NHOP), MS-PW traffic specification (sender_tspec), etc, are only stored once, thereby greatly reducing the memory requirements of the provider edge equipment and improving the equipment scalability at a further extent.

If a new MS-PW is to be signaled, let us say MS-PW8 between T-PE0 and T-PE5, then MS-PW8 signaling can be merged with MS-PW4 to MS-PW7 signaling under GID0 and SGID01 identifiers between T-PE0 and S-PE1, with MS-PW4 to MS-PW5 signaling under GID0 and SGID12 identifiers between S-PE1 and S-PE2, and with MS-PW5 signaling under GID0 and SGID25 identifiers between S-PE2 and T-PE5.

Alternatively, MS-PW8 can make use of another sub-group identifier between some or all T/S-PE adjacencies, in which case resource reservation information related to MS-PW4 to MS-PW7 do not need to be signaled again, thereby saving substantial signaling bandwidth and processing.

It is up to the previous signaling node to decide whether a new MS-PW is to be merged with already signaled MS-PWs under the same sub-group identifier (provided of course it shares the same PSN tunnel), or is to be signaled by means of a new sub-group identifier.

In an alternative embodiment of the present invention, pseudo point-to-point connections are PWs established between two PES, acting indistinctly as root node or leaf node (and thus as previous or next signaling hop). These PWS may share the same PSN tunnel or may be conveyed across two or more PSN tunnels. The tunnel and multiplexing topology will ultimately control up to which extent resource reservation signaling can be aggregated according to the present invention.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A method for reserving network resources for pseudo point-to-point connections based on an idempotent resource reservation protocol, said method comprising:
    encoding, into a resource reservation signaling message a group identifier assigned to a group of pseudo point-to-point connections established between a root node and at least one leaf node and a sub-group identifier assigned to a sub-group of pseudo point-to-point connections out of said group of pseudo point-to-point connections, which sub-group of pseudo point-to-point connections sharing a common network tunnel established between a previous signaling hop and a next signaling hop;
    aggregating, into said resource reservation signaling message, resource reservation signaling related to said sub-group of pseudo point-to-point connections by based on said group identifier and said sub-group identifier; and
    exchanging said resource reservation signaling message between said previous signaling hop and said next signaling hop.

2. A method according to claim 1, wherein said method further comprises:
    aggregating resource reservation states related to said sub-group of pseudo point-to-point connections based on said group identifier and said sub-group identifier.

3. A method according to claim 1, wherein said idempotent resource reservation protocol is RSVP-TE,
    a session object includes said group identifier
    and one of a sender_template object and a filter_spec object includes said sub-group identifier.

4. A method according to claim 1, wherein said pseudo point-to-point connection are multi segment pseudo wires.

5. A network node comprising:
    a signaling unit configured to reserve network resources for pseudo point-to-point connections based on an idempotent resource reservation protocol,
    wherein said signaling unit is further configured to encode, into a resource reservation signaling message,
        a group identifier assigned to a group of pseudo point-to-point connections established between a root node and at least one leaf node, and
        a sub-group identifier assigned to a sub-group of pseudo point-to-point connections out of said group of pseudo point-to-point connections, which sub-group of pseudo point-to-point connections sharing a common network tunnel established between said network node and a further signaling hop,
    to aggregate, into said resource reservation signaling message, resource reservation signaling related to said sub-group of pseudo point-to-point connections based on said group identifier and said sub-group identifier,
    to transmit said resource reservation signaling message to said further signaling hop.

* * * * *